3,655,848
SURFACE TREATMENT OF INTERIOR OF
PARISON PREFORM
Richard K. Young and Calvin D. Dockery, Bartlesville,
Okla., assignors to Phillips Petroleum Company
Filed Aug. 18, 1969, Ser. No. 850,783
Int. Cl. B29c 17/07, 17/14
U.S. Cl. 264—98                                7 Claims

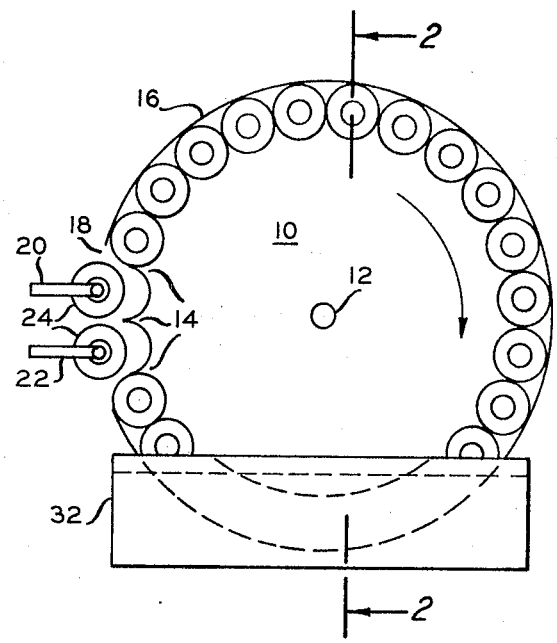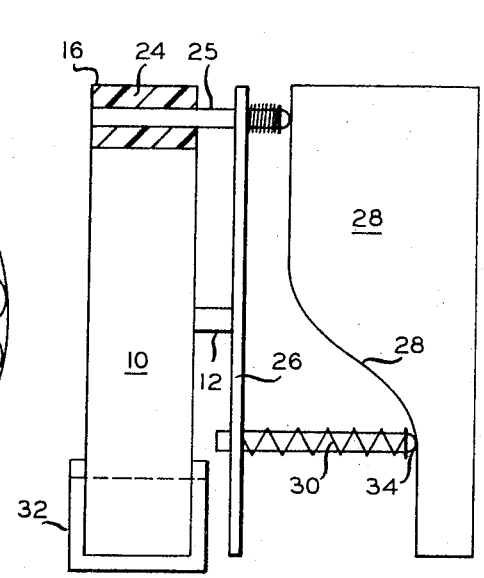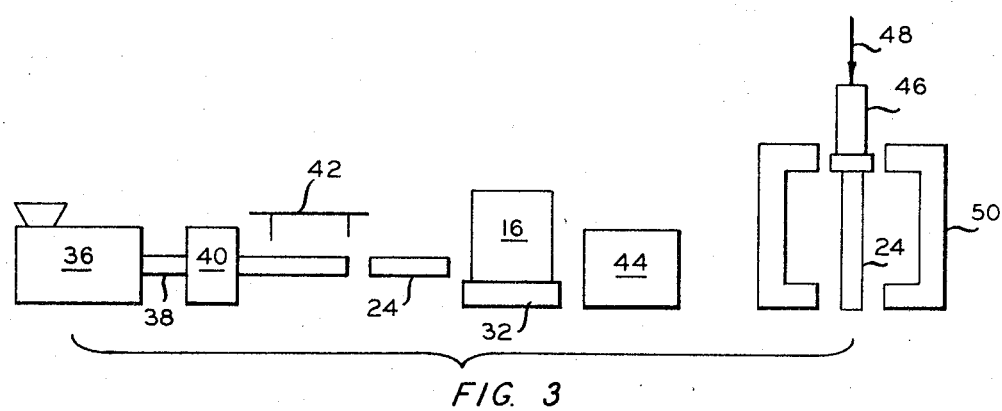

ABSTRACT OF THE DISCLOSURE

Method for treating the interior of a parison preform and forming a biaxially oriented hollow article therefrom. Parison preforms are formed by extruding olefin polymer in tube form and cutting the tube into individual preforms. The interior of each preform is heat treated to melt the interior surface thereof to a depth of 0.1 to 15 mils and is then quenched. The treated parison is then reheated to the orientation temperature, stretched longitudinally, placed in a mold and blown to the shape of the mold.

BACKGROUND OF THE INVENTION

This invention relates to the production of parison preforms for subsequent blow molding operations.

It is known to produce biaxially oriented hollow articles such as bottles from tubular parisons of olefin polymers by reheating the parison to orientation temperature and thereafter stretching longitudinally and circumferentially to give a biaxially oriented article. In addition to the strength imparted by the orientation process, the resulting articles quite surprisingly have been found to exhibit greatly increased transparency and gloss. See, for instance, Wiley, U.S. 3,288,317, Nov. 29, 1966, and Turner et al., U.S. 3,390,426, July 2, 1968.

The most economical method of forming parison preforms for a subsequent blow molding operation is by means of the continuous extrusion of a tube or pipe which tube is thereafter severed into individual work pieces. This method of fabrication effects a considerable saving over injection molding the parison preforms or forming them in other ways. It has been found that the surface characteristics of the parison preform have an effect on the degree to which the orientation process effects an improvement in transparency. In general, a parison preform having a smooth, glossy surface will yield a finished product having greater gloss and transparency. However, the factors affecting the optical properties of the finished product are not entirely understood since, in many instances, differences in the surface characteristics of the parison preform which cannot be seen with the naked eye have a marked effect on the optical properties of the finished product.

In the extrusion of the tube from which parison preforms are made, it is possible to provide a good outer surface by means of passing the molten extrudate through a smooth sizing sleeve and by means of quenching the outer surface of the tube through contact with said sizing sleeve and/or water. The inner surface of the pipe is not easily susceptible to such manipulative steps, however.

SUMMARY OF THE INVENTION

It is an object of this invention to provide for the production of improved parison preforms;

It is a further object of this invention to provide for the production of parison preforms having a smooth inner surface;

It is yet a further object of this invention to allow the production of parison preforms having good surface characteristics in an economical manner; and It is still yet a further object of this invention to provide for the production of blow molded articles having enhanced optical properties.

In accordance with this invention, the inner surface of a parison preform of an olefin polymer is melted and thereafter quenched.

BRIEF DESCRIPTION OF THE DRAWINGS

In the drawings forming a part hereof wherein like reference characters denote like parts in the various views, FIG. 1 is a schematic representation of an apparatus for carrying out this invention as seen from the side; FIG. 2 is a cross section along lines 2—2 of FIG. 1; and FIG. 3 is a schematic representation of a parison extrusion and fabricating operation utilizing the instant invention.

DESCRIPTION OF THE PREFERREED EMBODIMENTS

The novel parison treating process of the instant invention can be used in the fabrication of hollow thermoplastic parison preforms from any orientable thermoplastic material such as polymers of at least one 1-olefin, said 1-olefin having 2 to 8 carbon atoms per molecule, and the like. It is especially useful in the treating of parison preforms made from polymers of 1-olefins selected from the group consisting of ethylene, propylene, butene, and mixtures thereof, more particularly, polypropylene.

These polymers are formed into hollow parison preforms by extruding a continuous length of tubing which is cooled to below the crystalline freeze point of the polymer and severed into individual parisons of the desired length. After treatment of the inner surface in accordance with the instant invention, these hollow parison preforms in the solid state are then heated to a temperature within 1–50°, preferably 10–30°, below the crystalline melting point of the thermoplastic material comprising the parison. The thus heated parison is then stretched longitudinally and placed into a molding cavity and fluid pressure introduced into the interior of the parison to cause it to expand into conformity with said molding cavity, and thus undergo circumferential orientation. The parison may be pinched shut prior to the stretching operation or preferably, the parison is stretched and thereafter pinched shut as the mold halves close upon it.

The crystalline melting point can be determined by heating a small piece of the plastic under a polarizing microscope. The specimen is heated slowly and the temperature at which birefringence disappears is the crystalline melting point.

It is understood that while this invention is described primarily in terms of treating crystalline thermoplastic materials, such as polypropylene, since it is in this frame of reference that the most remarkable beneficial effects of flowing therefrom can be seen, it is within the scope of the invention to provide a tubular material of any composition having an outer surface smoothed by the initial extrusion and inner surface having improved characteristics imparted by melting and thereafter quenching.

The inner surface is preferably melted by means of the introduction of an elongated radiant heating means as shown in the drawings. However, any means of imparting the requisite heat can be utilized. As an example, an open flame could be utilized or a stream of heated fluid.

The heating step is carried out for a sufficient time under a sufficient intensity so as to melt the inner surface of the parison without melting the bulk of the parison. Generally the inner surface of the parison to a depth of about .1 to 15, preferably 1 to 8 mils will be melted. A satisfactory treatment level is from 300 to 500 watt-sec./in.$^2$, preferably 350–450 watt-sec./in.$^2$. It has been found that undertreating results in no improvement in bottle clarity whereas overtreating causes distortion in the parison interior which is fixed when the parison is quenched. Preferably the heat treatment is carried out using high intensity for a relatively short time so that the surface can be melted without appreciable heating of the bulk of the parison.

The time for heat treating the interior of the parison can vary depending on the heat capacity of the polymer, the intensity of the heating source, and the degree of heating desired. Generally a time of 1–60 seconds is satisfactory. With polypropylene parisons treated using a slender quartz radiant heater, times of 27–30 seconds have been found to be satisfactory.

Immediately after the treatment of the interior to melt the inner surface, this inner surface must be quenched. This can most conveniently be done by introducing the parison into a water bath or by flowing any cool fluid through the interior thereof. The quenching medium can be at a temperature within 0 to 200, preferably 40 to 80° F.

Surprisingly, it has been found that with parisons treated in accordance with this invention, the rate of reheating the treated parisons preparatory to the actual molding operation is more critical than is the case with untreated parisons. Preferably, the parisons are reheated to orientation temperature within a time of 25 minutes or less, preferably 18 to 24 minutes. The reason for this is not really susceptible to explanation, since if the heat treating step is effective because of melting the polymer to allow it to flow out to a more nearly smooth surface analogous to that formed mechanically on the outer surface, then the length of time the parison is subjected to heat in the final reheating step preparatory to blow molding should not have any effect. It appears from the observed data that while the treated surface layer constitutes a small proportion of the total volume of polymer, the small crystal structures formed therein by the quenching operation have a disproportionate effect on the optical properties of the ultimate oriented article. Of course, the permissible reheating times will vary somewhat, depending on the temperature to which the parison is exposed and the efficiency of heat transfer. In reheating parisons of polypropylene preparatory to the final blow molding operation in an air oven at 335° F., a time of 22 minutes for this reheating step has been found to be satisfactory. Thus, a reheating time of 18–25 minutes at an air temperature of 1–25, preferably 2–10° F., below the crystalline melting point is broadly suitable.

Referring now to the drawings, there is shown in FIG. 1 a side view of one apparatus suitable for carrying out the heat treatment of the interior of the parison. Drum 10 rotates about shaft 12. Around the periphery of drum 10 are a plurality of parison holding means 14 which may extend the entire width of the drum or may simply constitute gripping fingers at each end of the drum. Disposed about drum 10 is shield 16 having opening 18 in one side thereof. Drum 10 is disposed concentrically within shield 16. Disposed adjacent to opening 18 is loading means 20 which simply comprises an arm and mandrel means for grasping the parisons and transferring them into the holding means. Also adjacent opening 18 is unloading means 22 which comprises an arm and mandrel means similar to that of loading means 20. The loading and unloading means could comprise a single transfer mechanism which first removes a treated parison and thereafter inserts a new parison in its place. Drum 10 rotates in the direction shown by the arrow. The parisons 24 held by means 14 are prevented from falling out of holding means 14 by shield 16. Alternatively, shield 16 could be eliminated by using a parison holding means which firmly gripped the parison. As can be seen from FIG. 2, shortly after the parison is loaded onto the drum, an elongated quartz radiant heating means 25 is inserted into the interior of the parison. Heating means 25 is carried by wheel 26 which is also mounted on shaft 12 so as to rotate at the same velocity as the parison. Adjacent wheel 26 is curved cam surface 28. Heating means 25 is biased toward cam surface 28 by spring 30, spring 30 and wheel 26 comprising means for carrying said quartz radiant heater. Parison 24 is thereby heated during that time it passes through an arc beginning just past the point the parison is loaded and extending to a point just prior to the point drum 10 dips into tank 32. At this point, just prior to where the drum and shield enter tank 32, cam surface 28 is recessed, as shown at point 34, so as to remove heating means 25. The parison is then conveyed through that portion of an annular arc formed by drum 10 and shield 16 which is disposed within tank 32. Tank 32 is filled with water and since the ends of parisons 24 are opened, the water is free to circulate therethrough and thus quench the inner surface thereof.

In FIG. 3 there is shown an extruder 36 which forms a molten tubular extrudate 38 which is fed through vacuum sizing and quenching chamber 40 where it is cooled to a solid state preparatory to being cut into individual parisons 24 by cutting means 42. Parisons 24 are then fed into the parison receiving wheel within shield 16 and thence through quench tank 32. The resulting parisons having a treated inner surface are then heated to orientation temperature in oven 44 and thereafter transferred to a molding zone comprising a thread forming head 46, blow fluid line 48 and mold halves 50. Means can also be provided to grip the bottom of the parison and stretch it longitudinally prior to the introduction of blow fluid.

Many parts in these drawings such as temperature controllers, motors, relays, and the like have been eliminated for the purpose of simplicity, but their inclusion is understood by those skilled in the art and is within the scope of the invention.

EXAMPLE

Polypropylene homopolymer having a density of 0.905 (ASTM D 1505–63T) and a melt index of 1 (ASTM D 1238–62T, Condition L), and a crystalline melting point of 340° F. was extruded into tubing having an internal diameter of 0.8-inch and a wall thickness of 0.125-inch. The tubing was cooled to room temperature and cut into five-inch lengths. An elongated quartz radiant heater similar to that shown in the drawings was inserted into the parison for a time of 27–30 seconds, giving the interior a treatment level of about 400 watt-sec./in.$^2$. Thereafter, the heater was retracted and the interior of the parison immediately quenched by submersing the parison in a water bath maintained at about 50° F. No visible difference was apparent between the parison so treated and identical parisons which had not been subjected to this treatment of the interior. The above-treated parison was heated for a time of 22 minutes in an air oven at 335° F. Identical parisons which had not been treated on the interior were heated in an identical manner. One end of each of these parisons was pinched shut, the parison grasped at the opposite end thereof and stretched longitudinally. Thereafter, it was placed in a molding zone while still at orientation temperature and fluid pressure introduced to expand said parison out against the mold walls. The resulting bottles were visually observed and the following results noted:

Table.—Optical properties

| Run 1 [1]: | Control [2]: |
|---|---|
| Clear and glossy—much improved over control. | Moderately clear but slight haze apparent. |

[1] Inner surface treated in accordance with invention.
[2] No treatment of inner surface.

These data reveal that, surprisingly, the heat treatment of the inner surface while producing no visible effect on the parison preform, effects a remarkable improvement in the finished product. This could not have been predicted or expected since a visual examination of the treated parison would not indicate it had an improved surface. (Additional tests have shown that in some instances an improvement in the surface of the parison preform after heat treatment in accordance with the invention is observable.) It is to be noted that while the control bottle is shown to be inferior in optical clarity to that made from a parison treated in accordance with the instant invention, even the control bottle is remarkably clear as compared with bottles blown from fairly molten parisons which are essentially opaque.

A second parison heat treated on the interior thereof for 27–30 seconds in an identical manner to that of Run 1 above, was heated in an identical air oven at 335° F. for 26 minutes and thereafter biaxially oriented in a manner identical to that utilized in Run 1 and Control 1 hereinabove. The resulting bottle showed only slight improvement over Control 1 above and was not nearly as glossy and crystal clear as Run 1 above.

While this invention has been described in detail for the purpose of illustration, it is not to be construed as limited thereby, but is intended to cover all changes and modifications within the spirit and scope thereof.

We claim:

1. A method of forming biaxially oriented hollow articles comprising: extruding a tube of a mono-1-olefin having 2 to 8 carbon atoms per molecule; cutting said tube into individual work pieces; heat treating the interiors of said work pieces to melt the inner surfaces only to a depth of 0.1 to 15 mils; quenching said inner surfaces to give treated parisons; reheating said thus treated parisons to 1–50° F. below the crystalline melting point thereof; stretching said parisons longitudinally; introducing said parisons into a molding zone and stretching said parisons circumferentially by the introduction of fluid pressure to form biaxially oriented hollow articles conforming to the shape of said molding zone.

2. A method according to claim 1 wherein said inner surfaces are heated with radiant heat.

3. A method according to claim 1 wherein said heat is imparted at a level of 300–500 watt-sec./in.$^2$.

4. A method according to claim 1 wherein said olefin polymer is polypropylene.

5. A method according to claim 1 wherein said heat is imparted at a level of 350–450 watt-sec./in.$^2$ and said polymer is polypropylene.

6. A method according to claim 1 wherein said thus treated parisons are reheated to 10–30° F. below its crystalline melting point during a time interval of less than 25 minutes.

7. A method according to claim 1 wherein said inner surfaces are melted to a depth of 1 to 8 mils.

References Cited
UNITED STATES PATENTS 3,288,317  11/1966  Wiley _____ 264—98 X

OTHER REFERENCES

Raff and Doak; Crystalline Olefin Polymers, part II; © 1964 by John Wiley & Sons, Inc.; pp. 221–226.

ROBERT F. WHITE, Primary Examiner

J. H. SILBAUGH, Assistant Examiner

U.S. Cl. X.R.

263—7; 264—150